Figure 1:
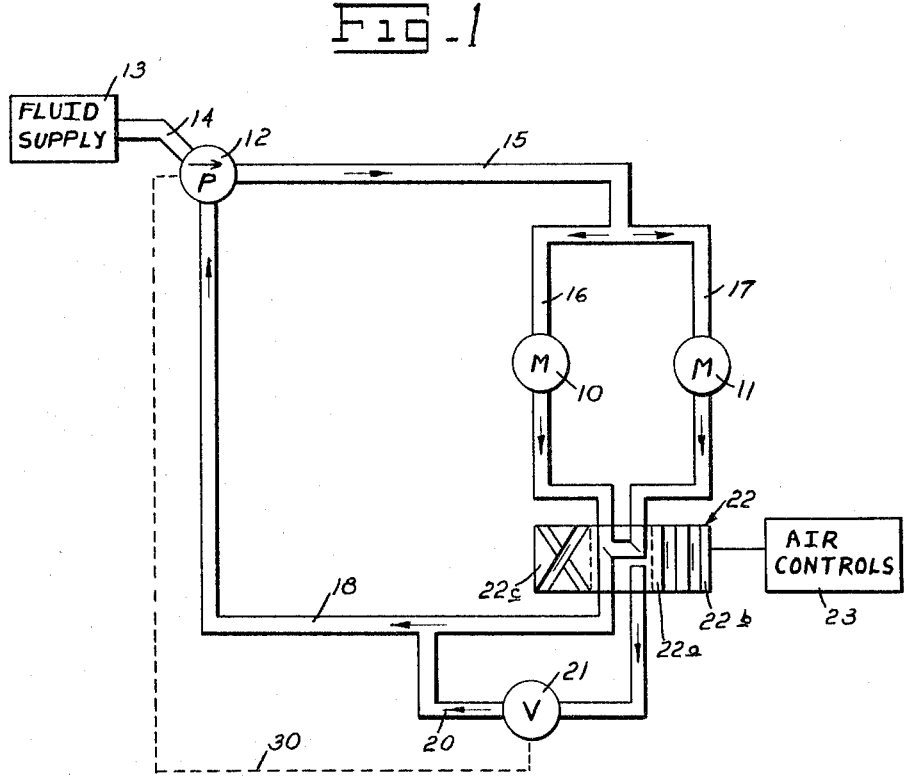

INVENTOR.
RAYMOND A. HANSON

3,282,050
STEERING SYSTEM
Raymond A. Hanson, % R. A. Hanson Company,
Palouse, Wash.
Filed Oct. 23, 1965, Ser. No. 502,907
5 Claims. (Cl. 60—52)

This invention relates to a novel apparatus for steering a vehicle of the type wherein individual driving units at the sides of the vehicle are independently driven by separate motor devices.

This invention is concerned with a hydraulic system for steering a vehicle by driving opposite ground engaging elements, which might be wheeled or track laying devices or other equivalent mechanisms. The hydraulic system utilized is powered by a single pump having outlets leading to two motors that independently drive the ground engaging devices. Variations in relative speed of the motors for steering purposes are effected by a combination of a steering control valve and a restrictive flow control valve, the entire hydraulic system being relatively simple compared to the complex controls necessary to operate separate motors by separate pumps.

It is a first object of this invention to eliminate the necessity of separate pumps to drive two driving motors, while retaining the versatility and speed control necessary in a proper steering system.

Another object of this invention is to simplify the hydraulic controls necessary in order to steer the vehicle by driving.

Another object of this invention is to provide a relatively simple mechanical interrelationship between a variable pump output and the speed ratio between two driven motors when a steering relationship is effected.

These and further objects will be evident from the following disclosure, taken together with the accompanying drawings, which illustrates a schematic form of the invention applicable to any suitable vehicle. It is to be understood that the diagram shown is only illustrative and that various equivalent mechanical and hydraulic devices could be substituted in place of those shown.

Figure 2:
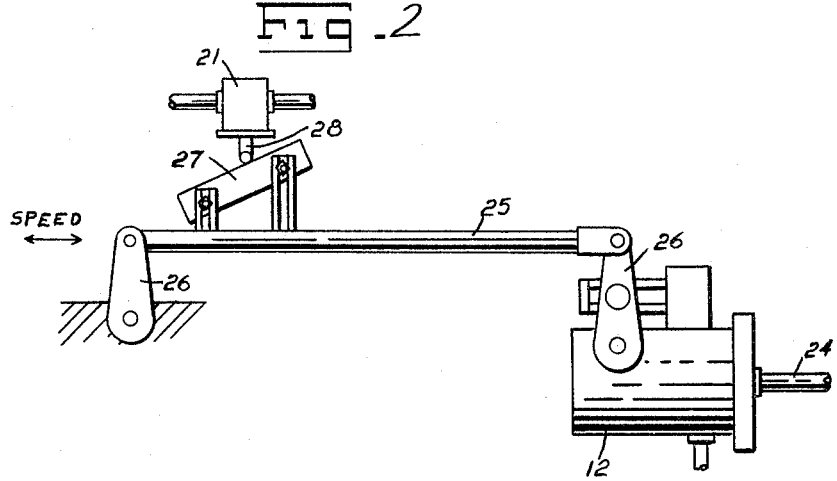

In the drawings:

FIGURE 1 is a schematic diagram showing the basic hydraulic system utilized; and FIGURE 2 is a fragmentary elevation view showing the mechanical interconnection between the pump control mechanism and the flow control valve used in the steering system.

FIGURE 1 shows the basic hydraulic system used to provide steering control in a vehicle having opposite ground engaging members. The vehicle is adapted to be powered by these members and to be steered by varying the driving speed of the members relative to one another. The particular structural features of the vehicle are not controlling as to the steering system and are not illustrated since this system can be adapted to any type of vehicle structure with separate and individually powered driving units at its sides.

As shown in FIGURE 1, the system controls two hydraulic motors 10 and 11 which will be respectively connected to wheels, track laying devices or other mechanisms at the opposites of the vehicle. The motors 10 and 11 are of conventional design, as are all of the various hydraulic components described herein.

Motors 10, 11 are supplied with moving fluid by means of a pump 12 which is powered by a suitable motor or engine (not shown). Pump 12 is provided with a source of fluid or reservoir 13 connected to pump 12 by means of a conduit 14. The reservoir 13 provides excess fluid to the closed hydraulic system to maintain that system with a complete fluid supply at all times.

The outlet of pump 12 is connected by means of a main outlet conduit 15 and two branch conduits 16 and 17 to the respective inlets of the identical motors 10, 11. Thus, motors 10, 11 are powered by the single outlet connection of pump 12.

Leading from the bottom of FIGURE 1 back to the inlet of pump 12 is a conduit 18. A by-pass conduit 20 is illustrated, being in open communication with the interior of conduit 18, and therefore also leading ultimately back to the inlet of pump 12. Interposed in the by-pass conduit 20 is a convention flow control valve 21 adapted to provide a variable restriction in the by-pass conduit 20.

Steering control for motors 10, 11 is provided by a four-way valve 22, shown schematically at the lower right hand corner of FIGURE 1. Valve 22 has four ports. The two inlet ports of the steering control valve 22 are connected to the outlets of motors 10, 11 respectively. The outlet ports of valve 22 are connected to conduit 18 and by-pass conduit 20 respectively.

Valve 22 has three positions. In its normal center position as illustrated, the inlet and outlet ports of valve 22 are connected in such a manner through a center section 22a of valve 22 that the outlet of each motor 10, 11 is hydraulically connected to the conduit 18. No connection is made to the flow control valve 21. The flow control valve 21 in this instance is inoperative, since the port connecting valve 22 to the by-pass conduit 20 is blocked and fluid cannot pass through the by-pass conduit 22 in either direction.

For steering purposes, valve 22 is shiftable to positions wherein the valve ports are connected by side sections 22b or 22c of the valve 22. These sections effect opposite connections between the individual outlets of motors 10, 11 and the two return conduits 18, 20 respectively. As illustrated, when valve 22 is positioned with valve section 22b interconnecting its ports, the outlet of motor 11 will be connected to conduit 20 and the outlet of motor 10 will be connected to conduit 18. The flow of fluid through the flow control valve 21 will slow the rate of speed of fluid to motor 11, causing motor 10 to run faster and motor 11 to run slower. Similarly, when valve section 22c is utilized, the outlet of motor 11 will be connected to the direct return conduit 18 while the outlet of motor 10 will be connected to the restricted by-pass conduit 20. In this instance, motor 11 will operate at a faster rate of speed than motor 10.

Valve 22 can be operated by any suitable control. The diagram in FIGURE 1 schematically shows air controls connected to valve 22. However, other controls can be used, such as manual controls or solenoid operated controls.

The basic problem in using a single pump to control steering motors is that as the pump output increases so as to increase the driving speeds of the two motors, the relative difference in speed effected by a flow control valve becomes greater and the steering correction becomes greater than desirable. To compensate for this, the mechanism indicated generally by the dashed line 30 in FIGURE 1 and shown specifically in FIGURE 2 is used.

The compensating arrangement shown in FIGURE 2 is designed to lessen the restriction of the flow control valve 21 responsive to increases in the volume of fluid supplied to motors 10, 11 by pump 12. Pump 12, which is powered by a pump shaft 24, is driven by a suitable motor or engine (not shown). A control linkage 25 is illustrated, carried by supporting cranks 26 at each of its ends. The linkage 25 and cranks 26 are connected mechanically to the variable volume control that regulates the output of pump 12. This connection is not illustrated, but can be any suitable direct or indirect connection so that the linkage 25 will reciprocate as the pump output is varied. As the volume output of pump 12 increases, the linkage 25 as illustrated will move to the right. Similarly, as the output of pump 12 decreases, linkage 25 will shift to the left.

Fixed to linkage 25 is an inclined cam 27 whose upper surface is in contact with a cam follower 28 connected to the controlling mechanism for the variation flow control valve 21. As shown, the follower 28 wil ride along the upper surface of cam 27. As linkage 25 travels to the right, the follower 28 will ride downwardly on cam 27. This will serve to lessen the restriction within the variable flow control valve 21 to compensate for the increased speed of motors 10, 11. Likewise, when the motor speed is decreased the restriction within the variable flow control valve 21 will be automatically increased.

In operation, for normal straight driving, valve 22 is situated with the center section 22a in communication with its respective ports. Pump 12 is used to drive the two motors 10, 11 at the same rate of speed due to the common unrestricted return through conduit 18. The speed of motors 10, 11 will be directly proportional to the output volume of pump 12. When steering is necessary, the control mechanism 23 will shift valve 22 to connect one of the motor outlets in communication with the by-pass conduit 20, including the variable flow control valve 21. The valve 21 will at all times be set with the proper restriction relative to the speed of pump 12 due to the direct mechanical relationship that exists by means of the arrangement illustrated in FIGURE 2. The relative amount of steering correction will remain substantially constant regardless of pump output and motor speed.

The above steering system, while unusually simple, provides accurate and dependable control for the independent motors 10, 11 and the ground engaging devices powered thereby. It has been effectively used in the steering of large construction vehicles and has provided an economical manner of utilizing a single driving pump to supply fluid to two driving motors.

Various modifications can be made, using equivalent devices, without deviating from the scope of this invention. Either a variable speed or variable volume pump can be used. For this reason, only the following claims are intended to limit and restrict the scope of this invention.

Having thus described my invention, I claim:

1. In an apparatus for controlling two fluid motors by a single pump having a pump inlet, a pump outlet and a pump control mechanism effective to vary the pump output at the pump outlet;
    a fluid source;
    means connecting the pump inlet to said fluid source;
    first conduit means operatively connected between the pump outlet and the respective motor inlets;
    second conduit means operatively connected to said pump inlet;
    third conduit means operatively connected to said second conduit means;
    a variable flow control valve interposed in said third conduit means;
    a shiftable steering control valve having inlet ports operatively connected to the outlets of said motors and outlet ports respectively connected to said second and third conduit means;
    and means interconnected between the pump control mechanism and said flow control valve to vary the restriction of said flow control valve responsive to variation in pump output.

2. An apparatus as defined in claim 1 wherein said steering control valve has a normal position wherein the motor outlets are in communication with said second conduit means, said steering control valve being movable to alternate positions wherein one motor outlet is in communication with said third conduit means.

3. An apparatus as defined in claim 1 wherein said variable flow control valve is controlled by a reciprocable member mounted thereon, said last-named means comprising:
    a linkage movable in conjunction with the pump control mechanism of said pump;
    and a mechanical connection between said linkage and said reciprocable member.

4. An apparatus as defined in claim 1 wherein said variable flow control valve is controlled by a reciprocable member mounted thereon, said last-named means comprising:
    a linkage movable in conjunction with the pump control mechanism of said pump;
    and a mechanical connection between said linkage and said reciprocable member;
    said connection being a cam on said linkage and a cam follower on said member in surface contact with said cam whereby the restriction of said flow control valve is varied proportionately as the output of said pump changes.

5. In an apparatus for steering by driving a vehicle having two ground engaging elements mounted at opposite sides thereof and operatively powered by independent fluid motors, a hydraulic control system, comprising:
    a fluid reservoir;
    a single pump unit having an inlet connected to said reservoir and an outlet branched equally to the inlets of said motors;
    a first valve connected to the outlets of said motors having a first position wherein the motor outlets are connected to a common connection leading back to the pump inlet and a second position wherein one of the motor outlets is connected to said common connection and the remaining outlet is by-passed through a variable flow control valve interposed between said first valve and said common connection;
    and means operatively connected to the controlling linkage of said pump unit and said flow control valve to lessen the restriction of said flow control valve in response to an increase in the output of said pump unit.

References Cited by the Examiner
UNITED STATES PATENTS

| | | | |
|---|---|---|---|
| 2,446,242 | 8/1948 | Orshansky | 180—6.48 X |
| 2,460,774 | 2/1949 | Trautman | 91—412 X |
| 2,643,664 | 6/1953 | Willett | 91—412 X |
| 2,771,958 | 11/1956 | Ball | 180—6.48 |

EDGAR W. GEOGHEGAN, *Primary Examiner.*